(12) United States Patent
Hwang et al.

(10) Patent No.: US 7,658,490 B2
(45) Date of Patent: Feb. 9, 2010

(54) IMAGING APPARATUS WITH STOWABLE MEDIA TRAY

(75) Inventors: Peter G. Hwang, Vancouver, WA (US); Raymond C. Sherman, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1192 days.

(21) Appl. No.: 10/698,823

(22) Filed: Oct. 31, 2003

(65) Prior Publication Data

US 2005/0094227 A1 May 5, 2005

(51) Int. Cl.
*B41J 29/13* (2006.01)
*B41J 2/01* (2006.01)

(52) U.S. Cl. ...................... 347/108; 347/101
(58) Field of Classification Search ................. 347/108, 347/104, 101; 346/145; 400/691, 692, 693, 400/693.1, 694
See application file for complete search history.

(56) References Cited

U.S. PATENT DOCUMENTS

| | | | |
|---|---|---|---|
| 4,808,021 A * | 2/1989 | Kelly .......................... 400/717 |
| 4,847,632 A | 7/1989 | Norris |
| 5,081,487 A | 1/1992 | Hoyer et al. |
| 5,217,215 A * | 6/1993 | Ohata et al. ............... 270/58.16 |
| 5,241,353 A | 8/1993 | Maeshima et al. |
| 5,426,456 A * | 6/1995 | Kuelzer et al. ................. 347/30 |
| 5,523,848 A * | 6/1996 | Musso et al. ................. 358/296 |
| 5,567,068 A * | 10/1996 | Egashira et al. ............. 400/625 |
| 5,595,380 A | 1/1997 | McCue, Jr. et al. |
| 5,657,132 A * | 8/1997 | Samii ......................... 358/296 |
| 6,106,178 A | 8/2000 | Chiu |
| 6,152,630 A * | 11/2000 | Scarton et al. .............. 400/642 |
| 6,178,017 B1 | 1/2001 | Ishida |
| 6,179,499 B1 | 1/2001 | Beretta et al. |
| 6,350,073 B1 | 2/2002 | McCue, Jr. et al. |
| 6,406,201 B1 | 6/2002 | Beretta et al. |
| 6,428,000 B1 | 8/2002 | Hara et al. |
| D468,765 S * | 1/2003 | Kobayashi et al. ........... D18/55 |
| 6,582,139 B2 * | 6/2003 | Abe et al. ................. 400/599.1 |
| 6,848,685 B2 * | 2/2005 | Katsuyama ................. 271/162 |
| 6,991,331 B2 * | 1/2006 | Kagami et al. .............. 347/108 |
| 7,029,113 B2 * | 4/2006 | Hwang ....................... 347/108 |
| 7,258,334 B2 * | 8/2007 | Cheng ........................ 271/3.14 |
| 2003/0081101 A1 * | 5/2003 | Khormaei et al. ........... 347/104 |

* cited by examiner

*Primary Examiner*—Stephen D Meier
*Assistant Examiner*—Leonard S Liang

(57) ABSTRACT

An imaging apparatus has an interior cavity therein. A carriage is disposed within the interior cavity and is movable through a length of travel within the interior cavity. A cartridge is carried by the carriage. A swept volume includes the profile of the carriage and cartridge extended along the length of the carriage rod a distance equal to the length of travel of the carriage. A media tray is at least partially disposed within the cavity.

43 Claims, 11 Drawing Sheets

IMAGING APPARATUS WITH STOWABLE MEDIA TRAY

BACKGROUND

Consumers generally have limited amounts of space to devote to computing resources. Business owners also have limited amounts of space to devote to computing equipment. Many features of products are considered when making a buy decision. Most consumers and most business concerns seek equipment that is adequate to accomplish a particular task for a given cost. Another aspect of a product that is considered desirable by businesses and consumers is the amount of space the product uses. Generally, consumers and businesses consider a device with a smaller footprint more desirable. The footprint is the amount of floor space or desktop space required by the product. In short, the number of square inches the equipment uses is important to consumers and businesses. Printers are computing items that occupy desk space. As a result, there is a movement to minimize the footprint associated with printers, especially printers intended to be used on the desktop.

DETAILED DESCRIPTION

In the following detailed description of the embodiments, reference is made to the accompanying drawings that form a part hereof, and in which are shown by way of illustrating specific embodiments in which the invention may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of present inventions. The following detailed description, therefore, is not to be taken in a limiting sense, and the scope of various embodiments of the invention is defined only by the appended claims, along with the full range of equivalents to which such claims are entitled.

Figure 1:
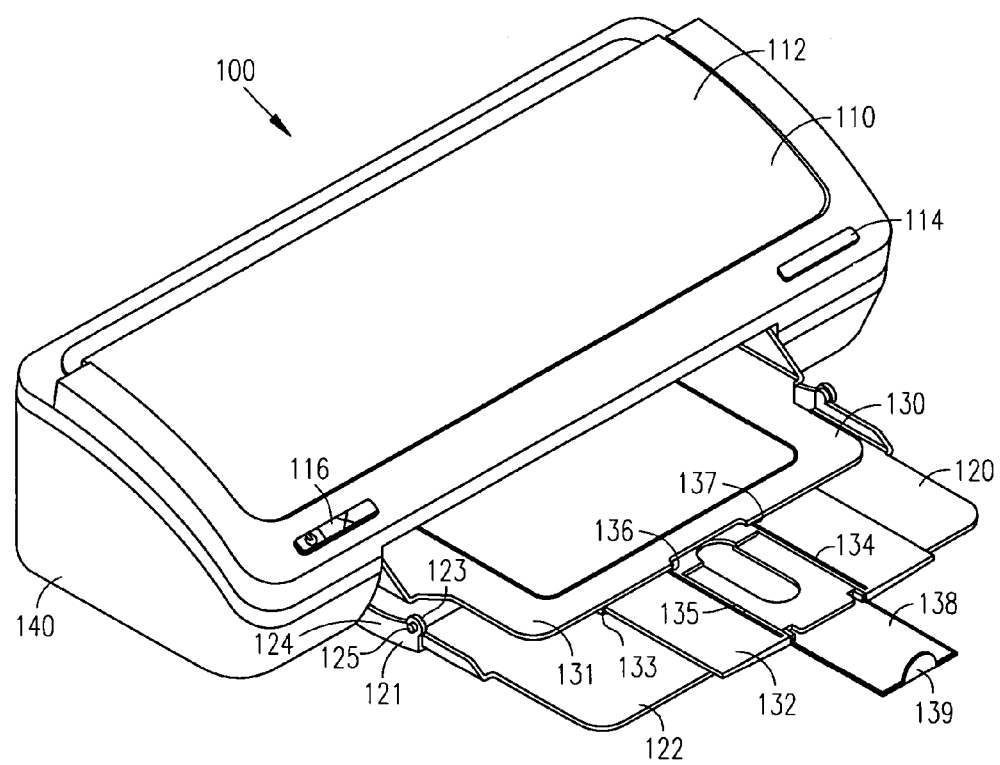
FIG. 1 is a perspective view of an imaging apparatus in which the input tray and the output tray are in an open deployed position, according to an embodiment of the invention.

FIG. 1 is a perspective view of an imaging apparatus in which the input tray and the output tray are in an open position, according to an embodiment of the invention. The imaging apparatus 100 includes a cover 110 which can be moved between an open and a closed position. The cover 110 is hingedly attached to a housing 140. The cover 110 is capable of being in the closed position shown in FIG. 1 when the input tray 120 and output tray 130 are in their deployed position as well as when the input tray 120 and the output tray 130 are in a stowed position within the housing 140. The cover 110 includes a curved surface 112. The cover 110 substantially covers an interior portion (shown in FIG. 2) of the housing 140 of the imaging apparatus 100 when in the position shown in FIG. 1.

The cover 110 also includes a set of buttons 114, 116. The button 114 is attached to a latch for latching and unlatching the cover 110 when it is moved from its closed position to an open position (shown in FIG. 2). Button 116 controls certain printer functions of the imaging apparatus 100. The buttons 114, 116 are optional. In some embodiments buttons 114, 116 control the power to the printer and the function of cancelling a print job. The buttons 114, 116 could also be used to control other functions of the printer. The output paper tray 130 includes a first portion 131 and a second portion 132. The first portion 131 of the output paper tray 130 includes a guide mechanism 133 to allow the second portion 132 of the output tray 130 to slide with respect to the first portion 131 of the output paper tray 130. The second portion 132 of the output tray 130 includes a set of tracks or grooves 134, 135. The tracks or grooves 134, 135 mate with a key 136, 137 which are attached to the first portion 131 of the output paper tray 130. Thus, when deploying the output paper tray 130, the second portion 132 of the output paper tray 130 can be moved along channels or guides 134, 135, 133 and moved with respect to the first portion 131 of the output paper tray. The second portion 132 of the output paper tray 130 also includes vertical flange 139 that can be grasped to slide the second portion 132 of the output paper tray 130, with respect to the first portion 131 of the output paper tray 130. As shown, when the output tray 130 is fully deployed, the second portion 132 of the output tray 130 is extended out from the first portion 131 of the output paper tray 130. In some embodiments of the invention, a third, portion 138 of the output paper tray 130 is used to catch paper that is ejected at high speed from the imaging apparatus or printer. A vertical flange 139 is positioned at the end of the flip-out portion 133. The vertical flange 139 serves as a wall to keep paper from falling off the tray 130.

The input paper tray 120 also has a first portion 121 and a second portion 122. The first portion 121 of the input paper tray is attached to the second portion 122 of the input paper tray 120 by a hinge 123. Therefore, the second portion 122 of the input paper tray folds, or rotates, with respect to the first portion 121 of the input paper tray 120. The first portion 121 of the input paper tray includes an exterior surface 124 which forms a portion of the exterior surface of the imaging apparatus 100 when the input paper tray 120 and the output tray 130 are in their stowed positions. The exterior surface 124 of the input paper tray 120 has a curved shape so as to conform with the curved shape of the housing on either side of the first portion 121 of the input paper tray 120. The first portion 121 of the input paper tray 120 also is hingedly attached to an interior portion of the housing 140. The second hinged connection allows the first portion 121 of the input paper tray 120 to be folded, or rotated, into a position where the exterior surface 124 of the input paper tray 120 is exposed when the input paper tray 120 and the output paper tray 130 are in their stowed positions. The first portion 121 of the input tray 120 also includes a detent 125. The detent 125 engages a feature on the interior portion of the imaging apparatus 100 so that the first portion 121 of the output tray 120 remains in a folded or stowed position after being placed in the stowed position.

Figure 2:
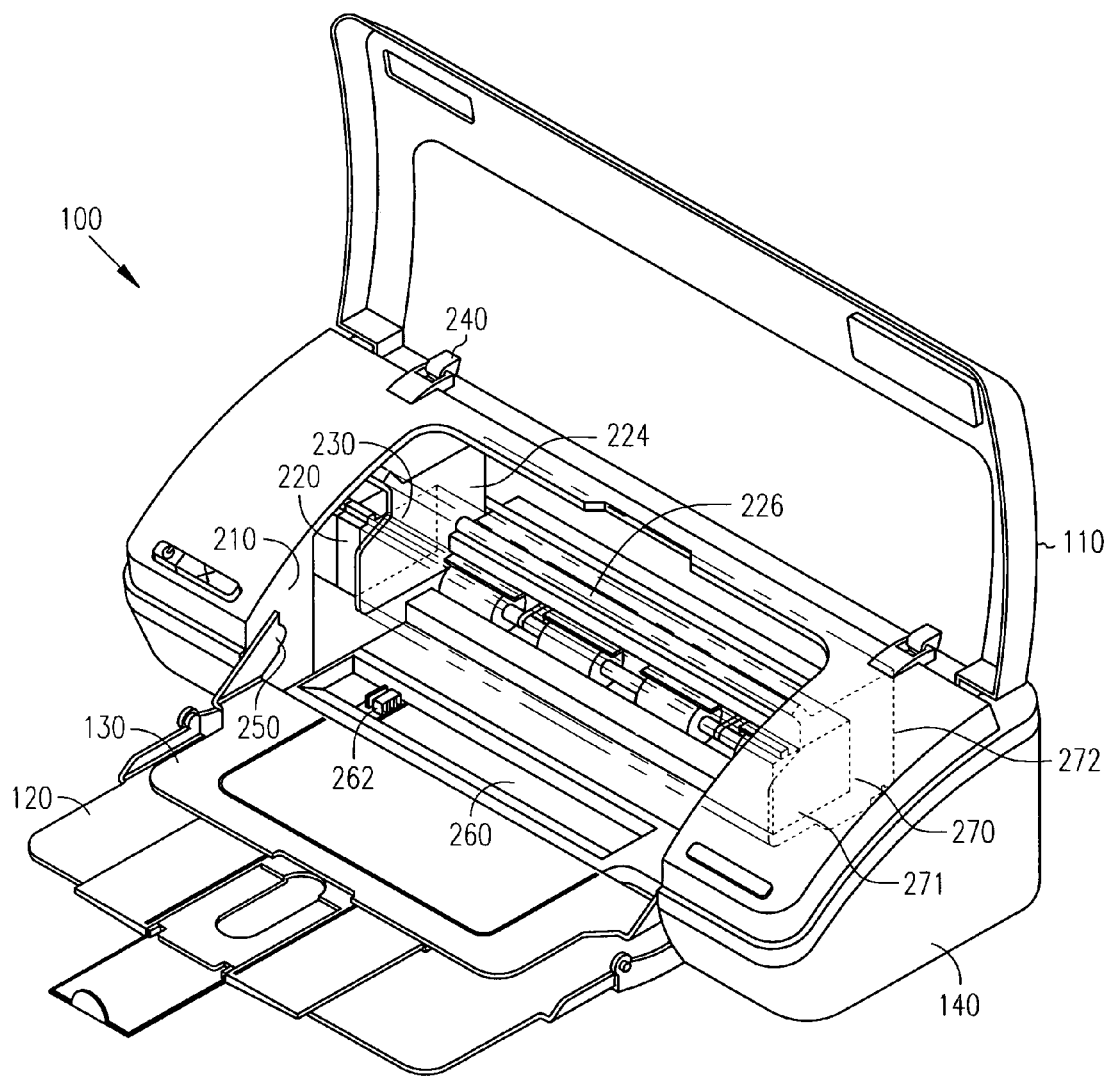
FIG. 2 is a perspective view of an imaging apparatus in which the input tray and the output tray are in a deployed position, and the cover is in an open position, according to another embodiment of this invention.

FIG. 2 is a perspective view of an imaging apparatus 100 in which the cover 110 is open while in the input tray 120 and the output tray 130 remain in the deployed position, according to another embodiment of this invention. The housing 140 includes an interior portion 210 sized so that both the input paper tray 120 and the output paper tray 130 can be folded and stowed within the interior portion 210 of the housing 140. The interior portion 210 of the housing includes a print medium handling system for supplying print mediums such as paper, card-stock, transparencies, mylar, foils, and similar print medium of any suitable type of sheet material. The input tray 120, the print media handling system, and the output tray 110 form a paper path through the imaging apparatus 100. Along the paper path are a series of rollers (not shown) may be optionally provided for delivering sheets of media from the input tray 120 into a position for receiving ink from a plurality of inkjet cartridges 220 which are held on a carriage 230. The inkjet cartridges 220 contain ink.

It should be noted that the term "ink", as used in this document may be used to refer to any substance that can be used to mark a print medium. The term "ink" may refer to liquid ink, dry toner, liquid toner and similar materials. A carriage 224 which holds the ink cartridges 230 can be driven along a guide rod 226 by a drive belt/pulley and motor arrangement (not shown). The carriage 224 sweeps across a page of media during the print process. The volume through which the carriage and ink cartridge passes is called the swept volume of the imaging apparatus 100. The carriage 224 and cartridge 230 have a maximum length of travel which corresponds to a dimension related to the maximum dimension of media that can be handled by the imaging apparatus 100. Moving the carriage 220 and cartridge 230 through the maximum length of travel or swath length defines various volumes that are shown in FIG. 2. The first volume is termed a carriage swept volume 270. The carriage swept volume 270 is the volume defined by a profile area of the carriage 224 multiplied by the maximum length of travel of the carriage 224 along the guide rod 226. The second volume is a cartridge swept volume 271. The carriage swept volume 271 is the volume defined by a profile area of the cartridge 230 multiplied by the maximum length of travel of the cartridge 230 along the guide rod 226. The third swept volume is a combined swept volume 272 that is the volume defined by a profile area of the cartridge 230 installed into the carriage 224 multiplied by the maximum length of travel of the carriage 224 and cartridge 230 along the guide rod 226. Portions of the cartridge swept volume 271 and the carriage swept volume 270 overlap. The combined swept volume 272 is the maximum volume presented by the cartridge 230 and the carriage 224. It should be noted that in other embodiments of the invention, the carriage 224 and the cartridge 230 may have different sizes than those shown in FIG. 2. The result is that the carriage swept volume 270, the cartridge swept volume 271 and the combined swept volume 272 will be different in other embodiments of the invention. Ink from the cartridges 220 is selectively deposited with using one or more ink droplets on a sheet of medium in accordance with instructions received via a conductor strip from a printer controller located within the housing 140. The printer controller generally receives instructions from a computer (not shown) such as a personal computer. In an alternate embodiment, a laser print engine, or other suitable print engine may be employed.

The interior portion 210 also includes a window 260. The window 260 is within the interior portion 210 and also passes through the output tray 130. The window 260 is therefore positioned over the input tray 120. Attached to the bottom of the housing 140 and within the paper path and adjacent the first portion 121 of the input paper tray 120 is a paper guide 262. The paper guide 262 allows for different sizes of paper, including letter size and A4 paper. The guide 262 projects through the window 260. In other embodiments, the window 260 provides or allows access to the guide 262.

The cover 110 is pivotally attached to the housing 140 by hinge 240. The cover 110 substantially covers the interior portion 210 of the housing 140 when in the position shown in FIG. 1. The input tray 120 and the output tray 130 are movable between a stowed position substantially within the interior portion 210 of the housing 140 and a deployed position substantially outside the housing 140. The input tray 120 and the output tray 130 are adapted to substantially fully support media. The input tray 120 is attached to in the interior portion 210 of the housing 140 with a hinge. The output tray 130 is also attached to in the interior portion 210 of the housing 140 with a hinge 250. In another embodiment, the imaging apparatus further includes a link pivotally attached to the interior portion of the housing with a third hinge. One of the input tray 120 or the output tray 130 is attached to in the interior portion 210 of the housing 140 with a first hinge 240, and the other of the input tray 120 or the output tray 130 is attached to in the link with a second hinge 250.

The input tray 120 is positioned near the output tray 130 when the input tray 120 and the output tray 130 are in the deployed position. In some embodiments, the output tray is positioned over or above the input tray when the input tray 120 and the output tray 130 are in the deployed position. As shown, the input tray 120 and the output tray 130 is positioned substantially directly over the input tray 120.

Figure 3:
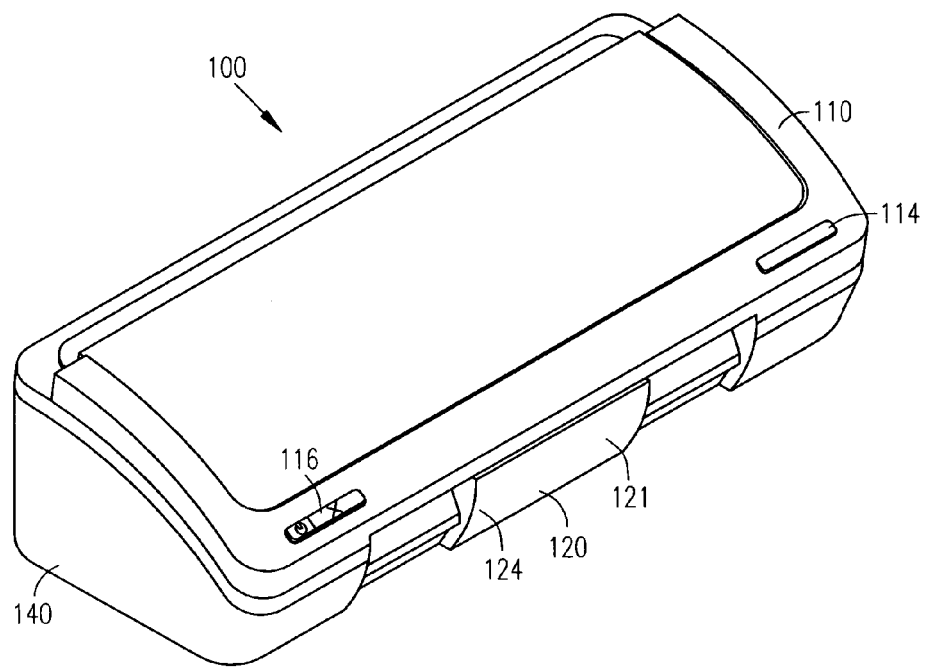
FIG. 3 is a perspective view of an imaging apparatus in which the input tray and the output tray are in a stowed position, according to another embodiment of this invention.

FIG. 3 is a perspective view of an imaging apparatus 100 in which the input tray 120 and the output tray 130 are in the stowed position and the cover 110 is in a closed position, according to another embodiment of the invention. As shown in FIG. 3, the input tray 120 and the output tray 130 have been folded into the interior portion 210 (shown in FIG. 2) of the housing 140. The cover 110 is then placed in the closed position and therefore covers the interior portion 210 of the housing 240. The exterior surface 124 of the first portion 121 of the output tray 120 is visible from the exterior surface of the imaging apparatus 100. The result is a very small footprint or a very small amount of space is needed on a desktop for the imaging apparatus 100. The input tray 120 and the output tray 130 are in a stowed position and the cover 110 is in a closed position. When the cover 110 is in a closed position, as shown in FIG. 3, with the input tray 120 and the output tray 130 in a stowed position, it is covering the interior portion just as when the input tray 120 and the output tray 130 are in the open position (as shown in FIG. 1).

The cover substantially covers the interior portion 210 (shown in FIG. 2) of the housing 140 when the input tray 120 and the output tray 130 are in the stowed position and the cover is in the position shown in FIG. 3. The cover 110 is movable between an open position and a closed position when the input tray 120 and the output tray 130 are in the deployed position. The cover 110 is also movable between an open position and a closed position when the input tray 120 and the output tray 130 are in the stowed position. In some embodiments, the input tray or output tray further include a slidably engaged extension member.

Figure 4A:
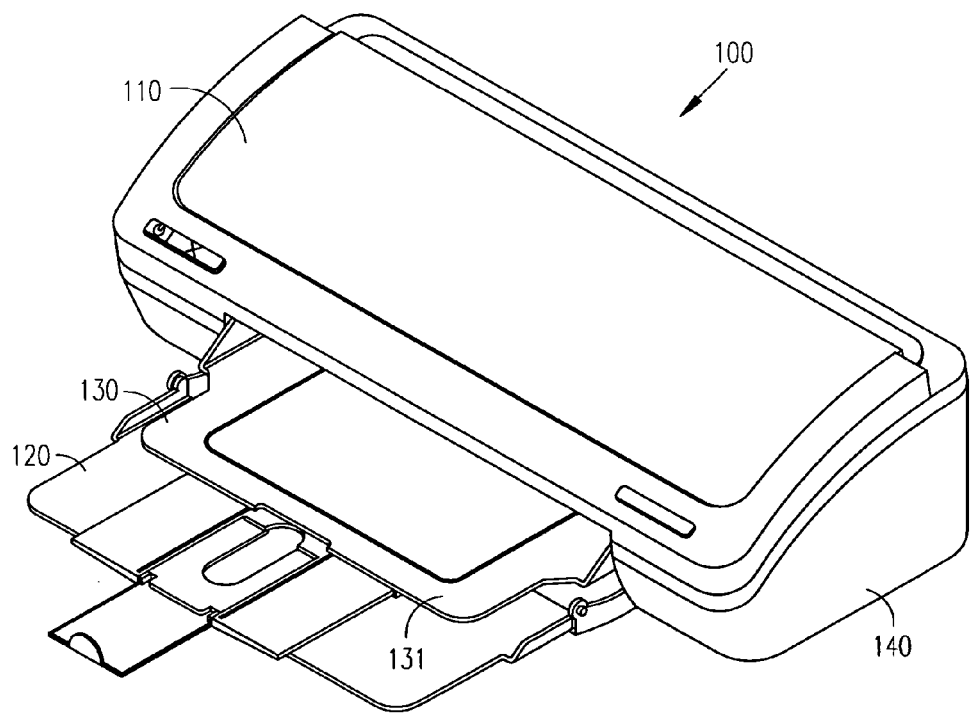
FIG. 4A is a perspective view of an imaging apparatus in which the input tray and the output tray are in an open position, according to an embodiment of the invention.

FIGS. 4A to 4F show the method by which the imaging apparatus 100 is transformed from a position where the input tray 120 and the output tray 130 are in a fully deployed position with the cover 110 in a closed position to when the input tray 120 and the output tray 130 are folded or placed in a stowed position within the interior portion 210 (shown in FIG. 2) of the housing 140 and the cover is closed. FIG. 4A is a perspective view of the imaging apparatus 100 in which the input tray 120 and the output tray 130 are in the open or deployed position, according to an embodiment of the invention. The cover 110 is also closed. When the cover is closed and the input tray 120 and the output tray 130 are in their deployed position, the imaging apparatus 100 is ready for executing print commands and printing. The media is placed on the input paper tray 120 and the type of paper is adjusted via the window 260 and via the guide 262, which is accessed through the window 260 (shown in FIG. 2). Printing can then take place and the paper moves from the input paper tray 120 along the paper path or media path to the output tray 130. Along the media path, ink is deposited on to the media in accordance with commands from the print controller in accordance with the print job requirements submitted to the printer. When a printing session is complete, the input paper tray and the output paper tray may be stowed within the housing or specifically within the interior portion 210 (shown in FIG. 2) of the housing 140.

Figure 4B:
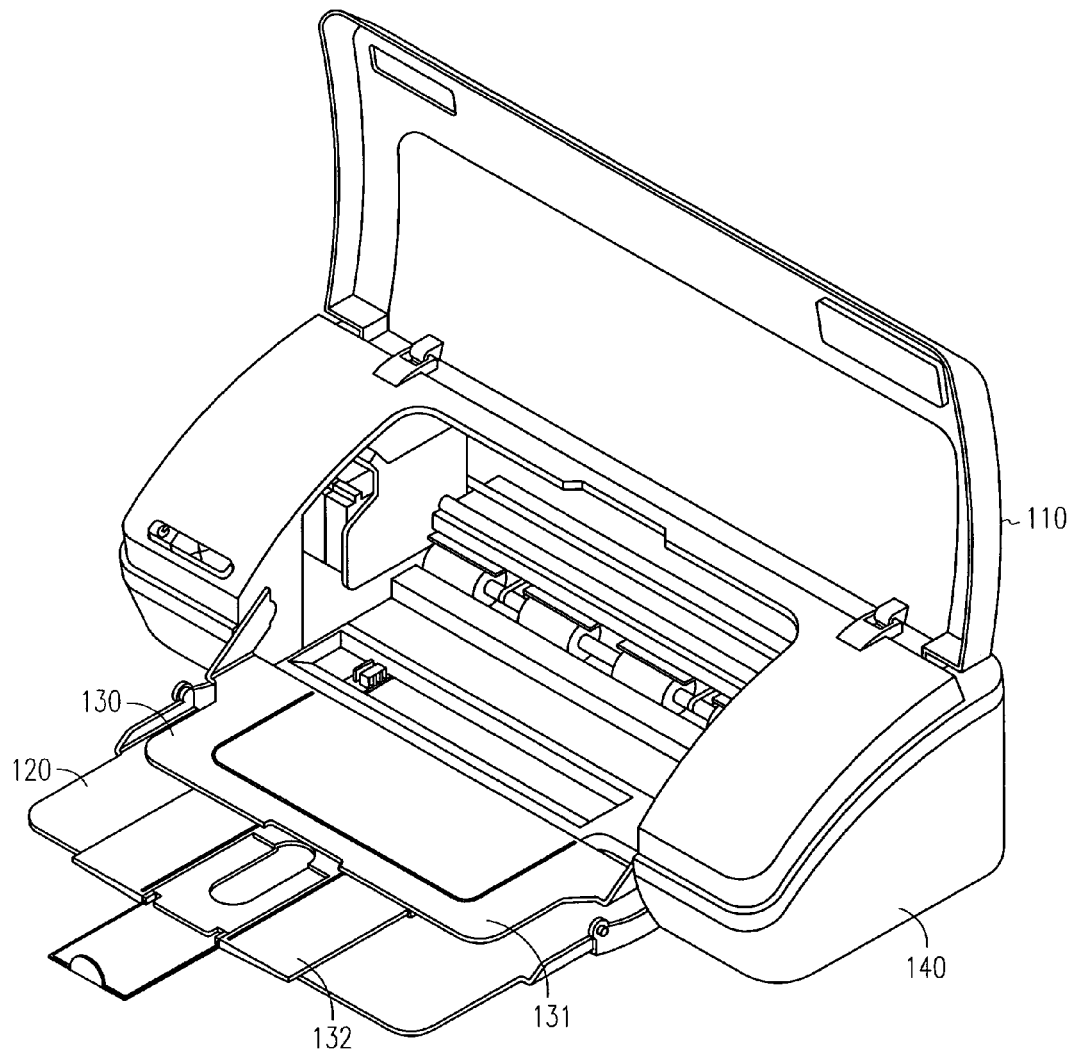
FIG. 4B is a perspective view of an imaging apparatus in which the cover of the housing is in an open position and the input tray and the output tray are also in an open position, according to an embodiment of the invention.

FIG. 4B shows another configuration of the imaging apparatus 100. In this configuration, the cover 110 is opened, by rotating the cover about the hinges 240, and the second portion 132 of the output paper tray 130 is slid into or slidably engaged with the first portion 131 of the output paper tray 130.

Figure 4C:
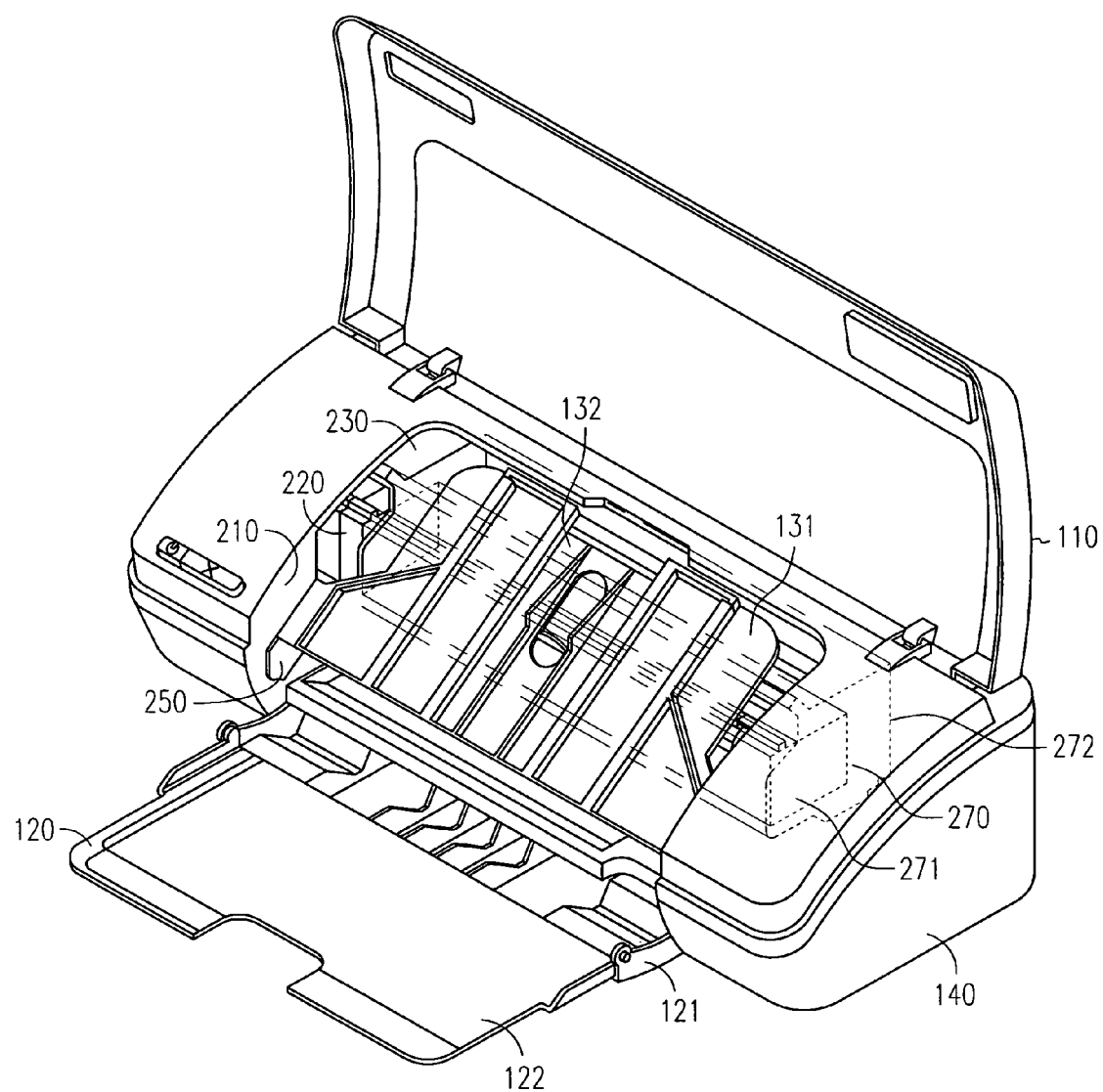
FIG. 4C is a perspective view of an imaging apparatus in which the cover of the housing is in an open position, the output tray is in a stowed position, and the input tray is in an open or deployed position, according to an embodiment of the invention.

Now turning to FIG. 4C, which is a perspective view of the imaging apparatus 100 in which the cover of the housing 140 is in an open position, the output tray 130 is in a stowed position, and the input tray 120 is in an open or deployed position. The carriage swept volume 270, the cartridge swept volume 271 and the combined swept volume 272 are shown with dotted lines. After sliding the second portion 132 of the output tray into full engagement within the first portion 131 of the output tray, the first portion 131 and second portion 132 of the output tray 130 are folded or rotated into the interior portion 210 of the housing 140. As shown in FIG. 4C, a portion of the output tray 130 extends into the swept volume 270. The output paper tray or the first portion 131 of the output paper tray 130 rotates about hinge 250. The hinge 250 is within the interior portion 210 of the housing 140.

Figure 4D:
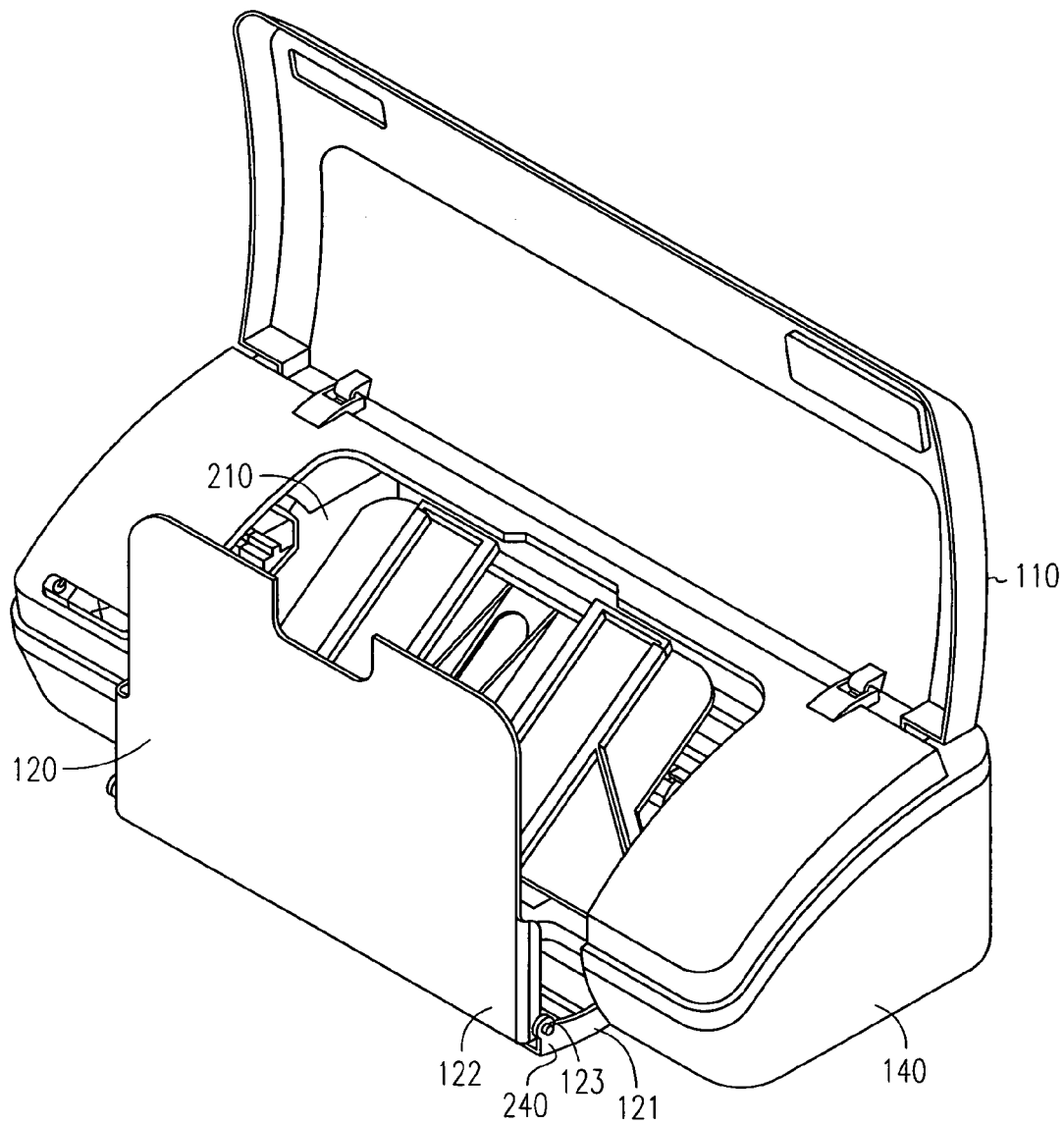
FIG. 4D is a perspective view of an imaging apparatus in which the cover of the housing is in an open position, the input tray is in a stowed position, and the output tray is in folded position, according to an embodiment of the invention.

Now turning to FIG. 4D, the output tray 130 is being moved to a stowed position and the input tray 120 has the second portion 122 folded with respect to the first portion 121 along hinge 123. In other words, the input tray 120 is not fully stowed but in a semi-folded position.

Figure 4E:
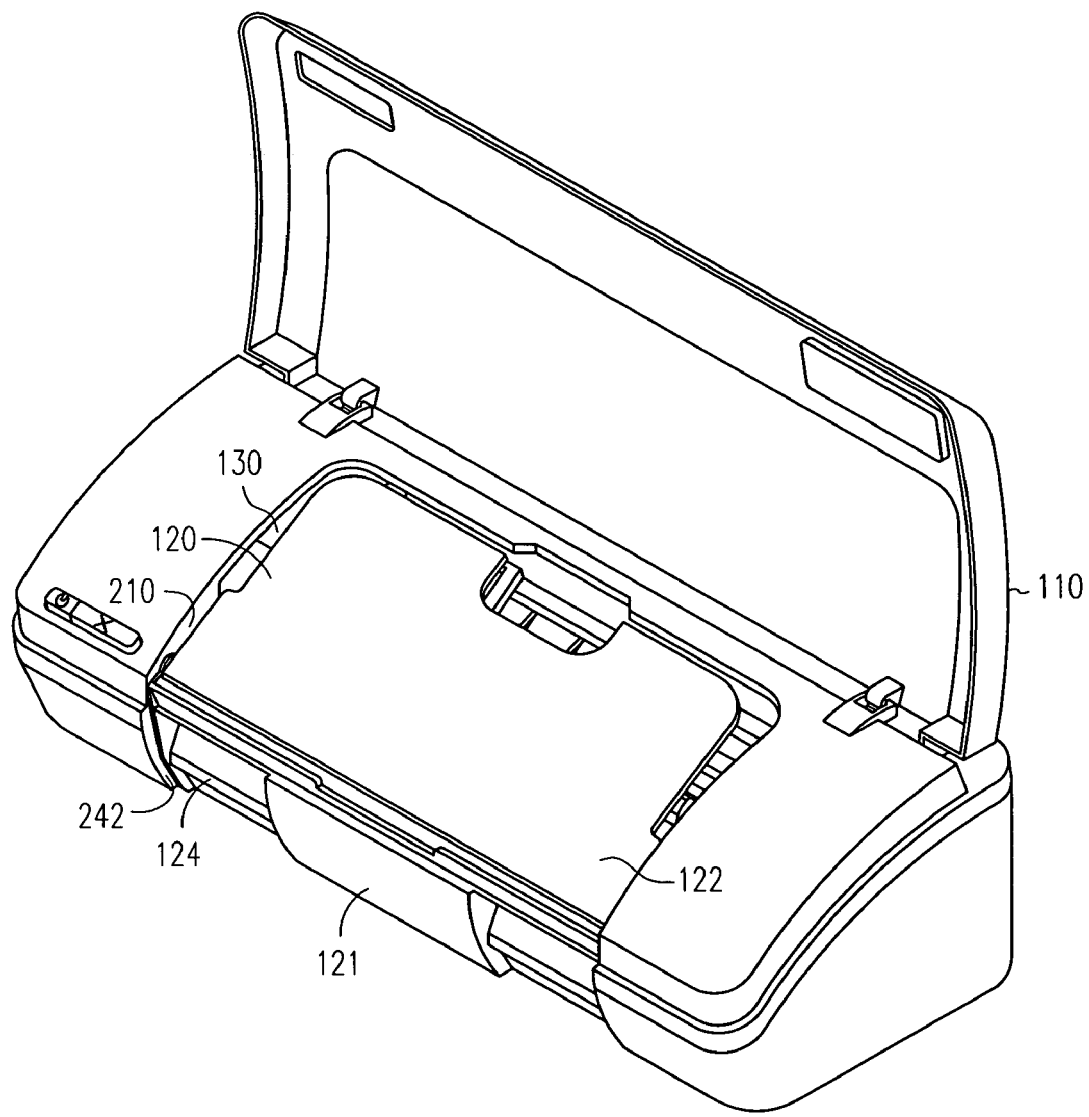
FIG. 4E is a perspective view of an imaging apparatus in which the cover of the housing is in an open position, the input tray is in a stowed position, and the output tray is in a stowed position, according to an embodiment of the invention.

FIG. 4E is a perspective view of the imaging apparatus 100 in which the cover 110 of the housing 140 remains in the open position while the input tray 120 is moved from a semi-folded position into a stowed position. The second portion of the input tray 122 is moved into the interior portion 210 or interior cavity 210 of the housing 140. The second portion 122 of the input tray 120 nests over the top of the output tray 130 and is positioned within the interior portion 210. The first portion 121 of the input tray 120 is rotated along a hinge 242 as the second portion 122 of the input tray 120 is nested with or positioned adjacent the output tray 130 within the interior portion 210 of the housing 140. Finally, the cover or lid 110 is moved from its open position to a closed position, thereby totally covering the output tray 130 and partially covering the input tray 120. The underside or exterior portion 124 of the second portion 122 of the input tray remains exposed on the exterior surface of the imaging apparatus 110 after it is in its stowed configuration. In other words, when the footprint of the imaging apparatus 100 is smallest, the exterior portion 124 of the second portion 122 of the input tray is exposed on the outside surface of the imaging apparatus 100. Although the swept volume 270 is not shown in FIG. 4E (see FIGS. 2 and 4C), in some embodiments a portion of the input tray extends into the swept volume. In other embodiments, a portion of the input tray does not extend into the swept volume 270.

Figure 4F:
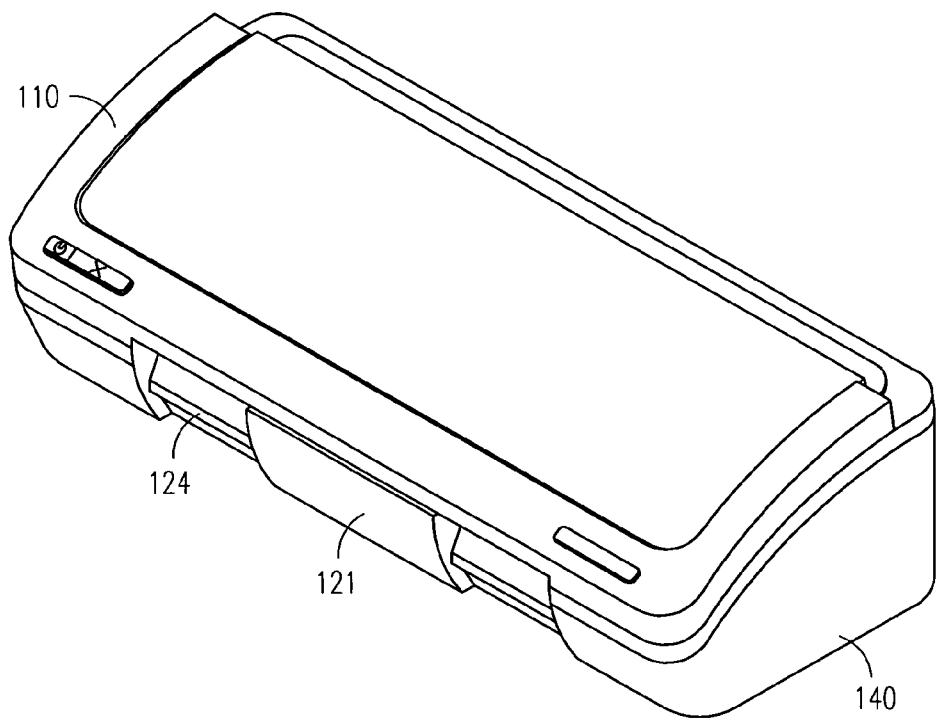
FIG. 4F is a perspective view of an imaging apparatus in which the cover of the housing is in a closed position with both the input tray and the output tray in stowed within the housing, according to an embodiment of the invention.

FIG. 4F is a perspective view of an imaging apparatus 100 in which the cover 110 of the housing 140 is in a closed position with both the input tray 120 and the output tray 130 in stowed within the housing 140 according to an embodiment of the invention. The imaging apparatus as shown in FIG. 4F is in the same position as shown previously in FIG. 3.

A method for moving a first media tray 130 and a second media tray 120 from a stowed position to a deployed position includes opening a lid that covers at least an interior cavity or interior portion 210 in a housing 140, rotating a first media tray 130 pivotally connected with the interior 210 of the housing 140 from a stowed position substantially within the interior portion 210 of the housing 140 to a deployed position where the first media tray 130 is substantially outside the cavity 210 of the housing 140, and rotating a second media tray 120 pivotally connected with the interior 210 of the housing 140 from a stowed position substantially within the cavity 210 of the housing 140 to a deployed position where the second media tray 120 is substantially outside the cavity 210 of the housing 140. The method also includes rotating a first portion 121 of the second media tray 120 with respect to a second portion 122 of the second media tray 120. The second portion 122 of the media tray is rotatably attached to the interior cavity 210 of the housing 140 near one end of the second portion. The second portion is rotatably attached to the first portion of the second media tray 120 at the other end of the second portion 122. In some embodiments, the method also includes moving a third portion of the second media tray with respect to the second portion of the second media tray.

Figure 5:
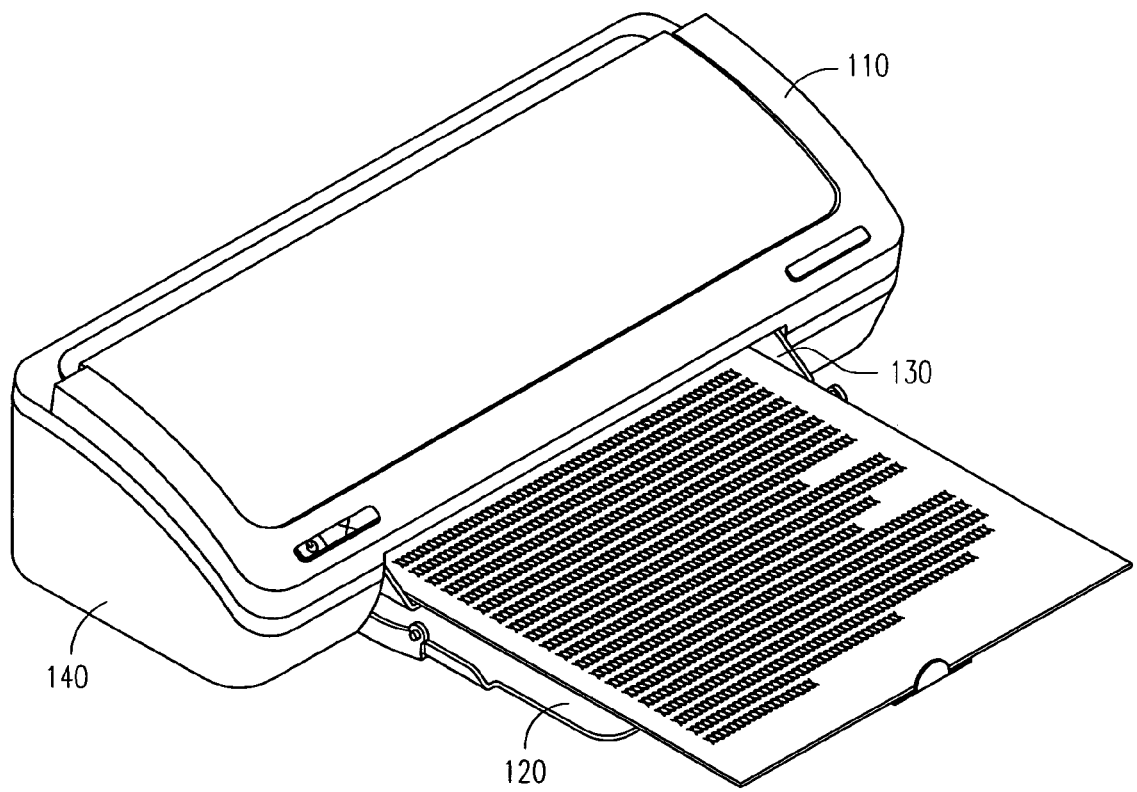
FIG. 5 is a perspective view of the imaging apparatus with media in the output tray.

FIG. 5 is a perspective view of the imaging apparatus with media in the output tray. In one embodiment of the invention, the second media tray 120 is placed below the first media tray 130, the method further includes presenting media in the first media tray 130 such that the media substantially covers the first media tray 130 and the second media tray 120. The method, in some embodiments, includes positioning a paper stop or vertical wall near the end of the first media tray 130.

Figure 6:
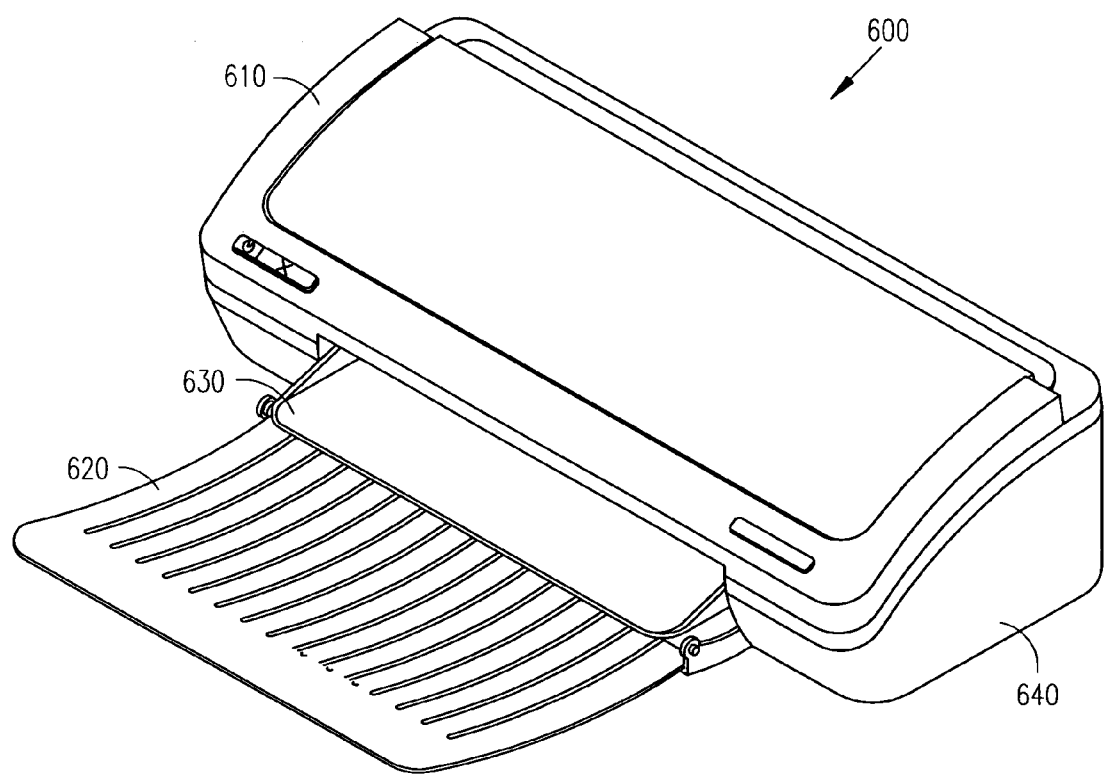
FIG. 6 is a perspective view of an imaging apparatus, according to another embodiment of this invention.

FIG. 6 is a perspective view of an imaging apparatus 600, according to another embodiment of this invention. In FIG. 6, the imaging apparatus 600 includes a housing 640, which is covered by a cover 610. Extending from the housing is a first paper tray or input paper tray 620, and a second paper tray or output paper tray 630. For the sake brevity and clarity, the differences between imaging apparatus 600 and imaging apparatus 100 will be discussed rather than giving a full description of the imaging apparatus 600. One difference, as shown in FIG. 6, is that the imaging apparatus 600 includes a shortened output paper tray 630. Other differences will be discussed with respect to other figures. Now looking at FIGS. 6 and 7, the imaging apparatus 600 will be discussed.

Figure 7:
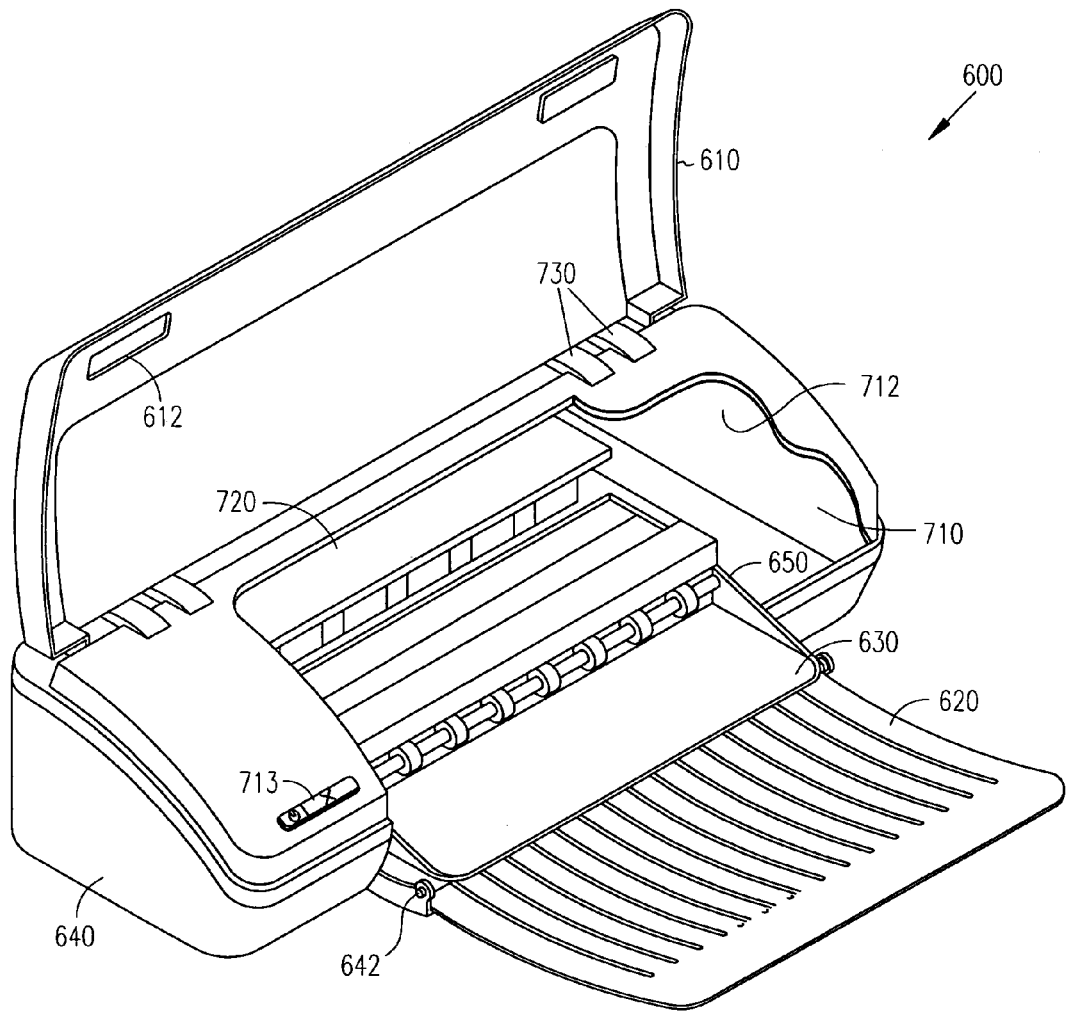
FIG. 7 is a perspective view of an imaging apparatus, in which the cover of the imagining apparatus is in an open position and the input tray and the output tray are in a deployed position, according to an embodiment of the invention.

FIG. 7 is a perspective view of an imaging apparatus 600, in which the cover 610 of the imaging apparatus 600 is in an open position and the input tray 620 and the output tray 630 are in a deployed position. The imaging apparatus 600 includes a first input tray 620, a second media holding tray 630, a housing 640 having an interior cavity portion 710 therein, and a device for allowing movement of the first media tray 620 and the second media tray 630 between a deployed position where at least a portion of the first media tray 620 and the second media tray 630 are positioned outside the housing 610, and a stowed position where the first media tray 620 and the second media tray 630 are positioned within the interior cavity 710 of the housing. The device for allowing movement of the first media tray 620 and the second media tray 630 further includes, on at least one of the first media tray 620 and the second media tray 630, a first hinge 642 attached to interior cavity 710 of the housing 640, and a second hinge 650 for allowing at least a first portion of the second media tray 630 to fold, or rotate, with respect to the housing 610. In some embodiments of the invention, imaging apparatus 600 can also have a flip-out paper stop affixed to the end of tray 620, to catch output pages and keep them from spilling off tray 620. In this case, output pages would come off the imaging apparatus 600, supported by output tray 630 on one end and the far end of input tray 620 on the other end. The flip-out output stop on the input tray 620 performs the same function as the flip-out paper stop in apparatus 100.

The housing 640 includes an interior portion 710. The interior portion includes a cutout 720 in the top case for clearing out paper jams. The cover 610 is attached to the housing 640 by way of hinges 730. The hinges 730 are molded into the core of the cover 610. The interior portion 710 also includes a pen or cartridge change area 712. The carriage, which holds the pens or cartridges, is moved to the pen change area 712. The housing 640 also includes a keypad 713 mounted into the top of the case. The cover 610 includes an opening 612 which corresponds to the keypad 713. Therefore, the keypad 713 which is mounted to the top of the housing 640 corresponds to the opening 612 in the cover 610. This allows the user to have access to the keypad 713 through the cover 610 and, specifically, through the opening 612 in the cover 610. The hinge mechanism 650 is also clearly visible in FIG. 7.

Figure 8:
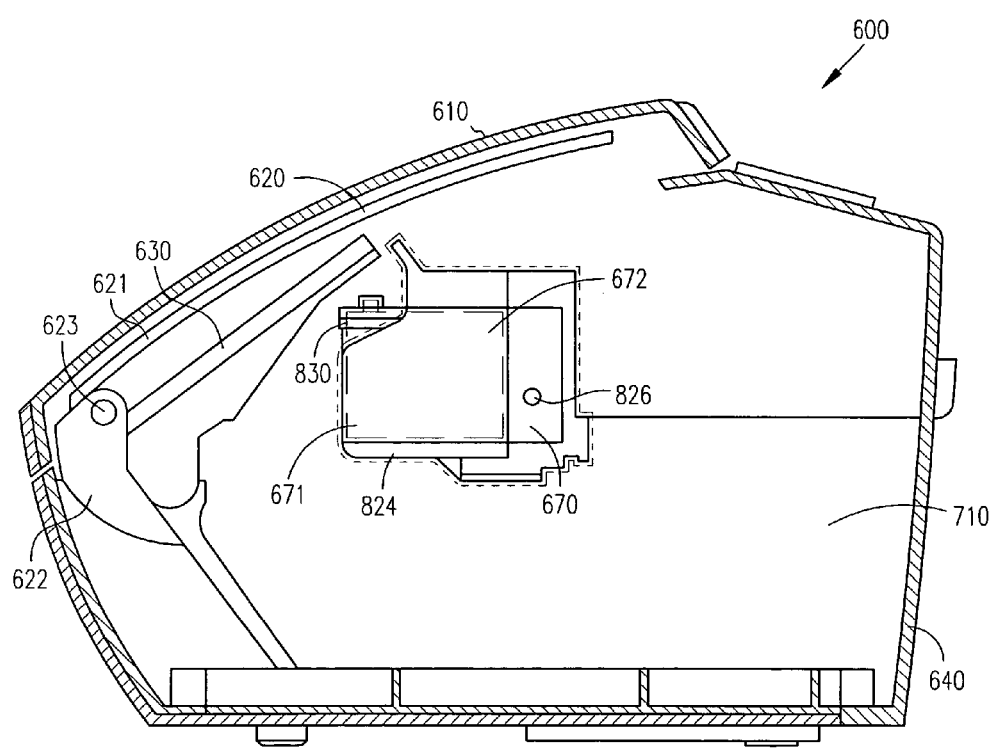
FIG. 8 is a broken-away view of the imaging apparatus which shows the interior of the housing when the cover is in its closed position and the first paper tray and the second paper tray are in a stowed position within the interior portion and covered by a cover, according to an embodiment of the invention.

FIG. 8 is a broken-away view of the imaging apparatus 600 which shows the interior 710 of the housing 640 when the cover 610 is in its closed position and the first paper tray 620 and the second paper tray 630 are in a stowed position within the interior portion 710 and covered by cover 610. The imaging apparatus 600 includes a guide rod 826 and a carriage 824. A belt and pulley and motor arrangement drive the carriage 824. A cartridge 830 fits within the carriage 824. The cartridge 830 includes one or more inks. The carriage 824 sweeps across a page of media during the print process. The volume through which the carriage 824 and the cartridge 830 passes defines several volumes within the interior of the housing 640. Each of the volumes is outlined with a dotted line in FIG. 8. The carriage 824 and cartridge 830 have a maximum length of travel which corresponds to a dimension related to the maximum dimension of media that can be handled by the imaging apparatus 600. Moving the carriage 824 through the maximum length of travel or swath length defines a carriage swept volume 670. The carriage swept volume 670, therefore, is the volume defined by a profile area of the carriage 824 multiplied by the maximum length of travel of the carriage 824. Moving the cartridge 830 through the maximum length of travel or swath length defines a cartridge swept volume 671. The cartridge swept volume 671, therefore, is the volume defined by a profile area of the cartridge 830 multiplied by the maximum length of travel of the cartridge 830. Moving the cartridge 830 and carriage 824 through the maximum length of travel or swath length defines a combined swept volume 672. The combined swept volume 670, therefore, is the volume defined by a profile area of the carriage 824 and inserted cartridge 830 multiplied by the maximum length of travel of the carriage 824 and cartridge 830. Portions of the cartridge swept volume 671 and the carriage swept volume 670 overlap. The combined swept volume 672 is the maximum volume presented by the cartridge 830 and the carriage 824. It should be noted that in other embodiments of the invention, the carriage 824 and the cartridge 830 may have different sizes than those shown in FIG. 8. The result is that the carriage swept volume 670, the cartridge swept volume 671 and the combined swept volume 672 will be different in other embodiments of the invention. The output tray or tray 630 flips into the forehead portion of the interior portion and actually fits in front of the combined swept volume 672 where the carriage 824 and cartridge 830 must pass. The output tray or tray 630, therefore, is also positioned outside of the carriage swept volume 671 and outside of the cartridge swept volume 671 when in the stowed position. The paper tray 620 fits over the output paper tray 630. The media tray 620 includes a first section 621 and a second section 622, which are hingedly attached by a hinge 623. The underside of the paper tray forms part of the exterior surface of the imaging apparatus after it is folded or after the input paper tray 620 is folded to its stowed position.

Although specific embodiments have been illustrated and described herein, those of ordinary skill in the art will appreciate that any arrangement calculated to achieve the same purpose can be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

In the foregoing Description of Embodiments of the Invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Description of Embodiments of the Invention, with each claim standing on its own as a separate embodiment.

What is claimed is:

1. An imaging apparatus comprising:
   a housing having an interior portion defining a cavity;
   a carriage and a carriage rod disposed within the cavity;
   a cover pivotally attached to the housing and configured to cover the cavity;
   a first media tray movably attached to the interior portion of the housing;
   a second media tray movably attached to the interior portion of the housing,
   wherein the second media tray and the first media tray are movable between a stowed position substantially within the cavity, and a deployed position substantially outside the cavity,
   wherein one of the first media tray or the second media tray provides an input tray for the imaging apparatus, and the other of the first media tray or the second media tray provides an output tray for the imaging apparatus,
   wherein the cover covers the first media tray and the second media tray when the first media tray and the second media tray are in the stowed position,
   wherein one of the second media tray or the first media tray is positioned over the other of the second media tray or the first media tray when the second media tray and the first media tray are in the deployed position.

2. The imaging apparatus of claim 1 wherein the second media tray is attached to the interior portion of the housing with a hinge.

3. The imaging apparatus of claim 1 wherein the first media tray is attached to the interior portion of the housing with a hinge.

4. The imaging apparatus of claim 1 wherein the second media tray is attached to the interior portion of the housing with a first hinge, and the first media tray is attached to the interior portion of the housing with a second hinge.

5. The imaging apparatus of claim 1 further comprising a link pivotally attached to the interior portion of the housing with a third hinge, wherein one of the first media tray or the second media tray is attached to the interior portion of the housing with a first hinge, and the other of the first media tray or the second media tray is attached to the link with a second hinge.

6. The imaging apparatus of claim 1 wherein the second media tray is positioned near the first media tray when the first media tray and the second media tray are in the deployed position.

7. The imaging apparatus of claim 1 wherein the first media tray is positioned over the second media tray when the second media tray and the first media tray are in the deployed position.

8. The imaging apparatus of claim 1 wherein the second media tray and the first media tray are positioned substantially directly over each other when the second media tray and the first media tray are in the deployed position.

9. The imaging apparatus of claim 1 wherein the cover covers the interior portion of the housing when the second media tray and the first media tray are in the stowed position.

10. The imaging apparatus of claim 1 wherein the cover is movable between an open position and a closed position when the second media tray and the first media tray are in the deployed position.

11. The imaging apparatus of claim 1 wherein the cover is movable between an open position and a closed position when the second media tray and the first media tray are in the stowed position.

12. The imaging apparatus of claim 1 wherein the housing includes a first side and a second side, wherein the second media tray and the first media tray are both positioned on one of the first side or the second side when the second media tray and the first media tray are in the deployed position.

13. The imaging apparatus of claim 1 further comprising a link pivotally attached to the interior portion of the housing with a third hinge, wherein one of the second media tray or the first media tray is attached to the interior portion of the housing with a first hinge, and the other of the second media tray or the first media tray is attached to the link with a second hinge and the other of the second media tray or the first media tray further comprising a slidably engaged extension member.

14. The imaging apparatus of claim 1 wherein one of the second media tray or the first media tray nests over the other of the second media tray or the first media tray when the second media tray and the first media tray are in the stowed position.

15. The imaging apparatus of claim 1 wherein the cover is openable to enable deployment of the first media tray and the second media tray.

16. An imaging apparatus comprising:
    a first media tray;
    a second media tray;
    a housing having an interior cavity and an opening to the interior cavity;
    a print engine disposed in the interior cavity; and
    means for allowing movement of the first media tray and the second media tray between a deployed position where at least a portion of the first media tray and the second media tray are positioned outside the interior cavity, and a stowed position where the first media tray and the second media tray are positioned within the interior cavity,
    wherein one of the first media tray or the second media tray provides an input tray for the imaging apparatus, and the other of the first media tray or the second media tray provides an output tray for the imaging apparatus,
    wherein the first media tray and the second media tray extend through the opening when the first media tray and the second media tray are in the deployed position,
    wherein one of the second media tray or the first media tray is positioned over the other of the second media tray or the first media tray when the second media tray and the first media tray are in the deployed position.

17. The imaging apparatus of claim 16 wherein means for allowing movement of the first media tray and the second media tray further includes at least one of the first media tray and the second media tray including:
    a first hinge positioned near one end of the at least one of the first media tray and the second media tray and attached to the interior cavity of the housing;

a second hinge for allowing a first portion of at least one of the first media tray and the second media tray to fold with respect to a second portion of the at least one of the first media tray and the second media tray; and a slideable portion for allowing a third portion of the at least one of the first media tray and the second media tray to slide with respect to another portion of the at least one of the first media tray and the second media tray.

18. The imaging apparatus of claim 17 wherein means for allowing movement of the first media tray and the second media tray further includes a third hinge positioned near one end of the other of the at least one of the first media tray and the second media tray and attached to the interior cavity of the housing.

19. The imaging apparatus of claim 16 further comprising a cover pivotally attached to the housing and configured to cover the interior cavity and the opening to the interior cavity.

20. The imaging apparatus of claim 19 wherein the cover covers the first media tray and the second media tray when the first media tray and the second media tray are in the stowed position.

21. The imaging apparatus of claim 19 wherein the cover is openable to enable deployment of the first media tray and the second media tray through the opening of the housing.

22. The imaging apparatus of claim 16 wherein one of the second media tray or the first media tray nests over the other of the second media tray or the first media tray when the second media tray and the first media tray are in the stowed position.

23. A method for moving a first media tray and a second media tray from a stowed position to a deployed position comprising:

opening a lid that covers at least an interior cavity in a housing and an opening in the housing to the interior cavity;

rotating a first media tray pivotally connected within the interior cavity of the housing from a stowed position substantially within the cavity of the housing to a deployed position where the first media tray extends through the opening and is substantially outside the cavity of the housing;

rotating a second media tray pivotally connected within the interior cavity of the housing from a stowed position substantially within the cavity of the housing to a deployed position where the second media tray extends through the opening and is substantially outside the cavity of the housing;

rotating a first portion of the second media tray with respect to a second portion of the second media tray, wherein the second portion of the media tray is rotatably attached to the interior cavity of the housing near one end of the second portion and wherein the second portion is rotatably attached to the first portion of the second media tray at the other end of the second portion; and sliding a third portion of the second media tray with respect to the second portion of the second media tray, wherein one of the first media tray or the second media tray provides an input tray, and the other of the first media tray or the second media tray provides an output tray.

24. The method of claim 23 wherein the first media tray is placed below the second media tray, the method further comprising presenting media in the second media tray such that the media substantially covers the first media tray and the second media tray.

25. The method of claim 23 further comprising positioning a paper stop near the end of the second media tray.

26. The method of claim 25 wherein positioning a paper stop near the end of the second media tray includes rotating a fourth portion of the second media tray with respect to a third portion of the second media tray.

27. An imaging apparatus comprising:

a housing having an interior cavity and an opening to the interior cavity;

a carriage rod disposed within the interior cavity;

a carriage disposed within the interior cavity and movable along a length of the carriage rod through a length of travel within the interior cavity;

a carriage swept volume, wherein the swept volume is the profile of the carriage extended along the length of the carriage rod a distance equal to the length of travel of the carriage; and a first media tray and a second media tray each being at least partially disposed within the carriage swept volume, wherein one of the first media tray or the second media tray provides an input tray for the imaging apparatus, and the other of the first media tray or the second media tray provides an output tray for the imaging apparatus, wherein one of the first media tray or the second media tray has a portion forming an exterior surface of the housing when in a stowed position, wherein the first media tray and the second media tray extend through the opening of the housing when in a deployed position.

28. The imaging apparatus of claim 27 wherein the first media tray and the second media tray are disposed within the interior cavity when in a stowed position.

29. The imaging apparatus of claim 27 further comprising a cover pivotally attached to the housing capable of substantially covering the interior cavity and the opening to the interior cavity.

30. The imaging apparatus of claim 29 wherein the cover covers the first media tray and the second media tray when the first media tray and the second media tray are in the stowed position.

31. The imaging apparatus of claim 29 wherein the cover is openable to enable deployment of the first media tray and the second media tray through the opening of the housing.

32. An imaging apparatus comprising:

a housing having an interior cavity and an opening to the interior cavity;

a print engine disposed within the interior cavity;

a carriage rod disposed within the interior cavity;

a carriage disposed within the interior cavity and movable along a length of the carriage rod through a length of travel within the interior cavity;

a carriage swept volume, wherein the carriage swept volume is the profile of the carriage extended along the length of the carriage rod a distance equal to the length of travel of the carriage; and a first media tray and a second media tray each being at least partially disposed within the interior cavity and outside the carriage swept volume when in a stowed position, wherein one of the first media tray or the second media tray provides an input tray for the imaging apparatus, and the other of the first media tray or the second media tray provides an output tray for the imaging apparatus, wherein one of the first media tray or the second media tray has a portion forming an exterior surface of the housing when in a stowed position, wherein the first media tray and the second media tray extend through the opening of the housing when in a deployed position.

33. The imaging apparatus of claim 32 further comprising a cover pivotally attached to the housing capable of substantially covering the interior cavity and the opening to the interior cavity.

34. The imaging apparatus of claim 33 wherein one of the first media tray or the second media tray has at least a portion disposed within the interior cavity of the housing and wherein one of the first media tray or the second media tray also has a portion positioned between the carriage swept volume and the cover when in a stowed position.

35. The imaging apparatus of claim 34 wherein the first media tray and the second media tray are disposed within the interior cavity when in a stowed position.

36. The imaging apparatus of claim 33 wherein the cover covers the first media tray and the second media tray when the first media tray and the second media tray are in the stowed position.

37. The imaging apparatus of claim 33 wherein the cover is openable to enable deployment of the first media tray and the second media tray through the opening of the housing.

38. A method comprising:
pivoting a lid of an imaging apparatus from a closed position to an open position to reveal an opening and enable deployment of a first media tray and a second media tray through the opening; and
rotating each of the first media tray and the second media tray from a stowed position to a deployed position, including extending each of the first media tray and the second media tray through the opening,
wherein one of the first media tray or the second media tray provides an input tray for the imaging apparatus, and the other of the first media tray or the second media tray provides an output tray for the imaging apparatus,
wherein one of the second media tray or the first media tray is positioned over the other of the second media tray or the first media tray when the second media tray and the first media tray are in the deployed position.

39. The method of claim 38 further comprising pivoting the lid of the imaging apparatus from the open position to the closed position while the first media tray and the second media tray are in the deployed position.

40. The method of claim 39 further comprising operating the imaging apparatus with the lid in the closed position and the first media tray and the second media tray in the deployed position.

41. The method of claim 40 wherein operating the imaging apparatus with the lid in the closed position and the first media tray and the second media tray in the deployed position includes moving media onto one of the first media tray or the second media tray.

42. The method of claim 40 wherein operating the imaging apparatus with the lid in the closed position and the first media tray and the second media tray in the deployed position includes removing media from one of the first media tray or the second media tray.

43. The method of claim 38 wherein one of the second media tray or the first media tray nests over the other of the second media tray or the first media tray when the second media tray and the first media tray are in the stowed position.

* * * * *